United States Patent [19]

Haloila

[11] Patent Number: 4,993,209
[45] Date of Patent: Feb. 19, 1991

[54] PROCESS AND MEANS FOR SEAMING AND CUTTING OFF A WRAPPING FILM

[75] Inventor: Matti Haloila, Poikko, Finland

[73] Assignee: Newtec International, Aix-les-Bains, France

[21] Appl. No.: 509,038

[22] Filed: Apr. 13, 1990

[51] Int. Cl.⁵ ............... B65B 11/00; B65B 13/00
[52] U.S. Cl. ....................... 53/399; 53/441; 53/463; 53/479; 53/556; 53/588; 53/373
[58] Field of Search ........... 53/556, 587, 588, 373, 53/441, 399, 463, 479

[56] References Cited

U.S. PATENT DOCUMENTS

| 3,802,155 | 4/1974 | Thomas et al. | 53/373 |
| 4,178,734 | 12/1979 | Lancaster | 53/441 X |
| 4,216,640 | 8/1980 | Kaufman | 53/556 |
| 4,619,102 | 10/1986 | Geisinger | 53/441 X |

FOREIGN PATENT DOCUMENTS

| 0180517 | 5/1986 | European Pat. Off. |  |
| 3115911 | 11/1982 | Fed. Rep. of Germany | 53/557 |
| 3236253 | 4/1984 | Fed. Rep. of Germany | 53/557 |

Primary Examiner—John Sipos
Attorney, Agent, or Firm—Body, Vickers & Daniels

[57] ABSTRACT

In a process and apparatus for seaming and cutting off a wrapping film wrapped about a product, a wrapping film holder moves the wrapping film against the film already wrapped about the product. Then, hot air from within the film holder is blown against the wrapping film for seaming and cutting off the film.

12 Claims, 4 Drawing Sheets

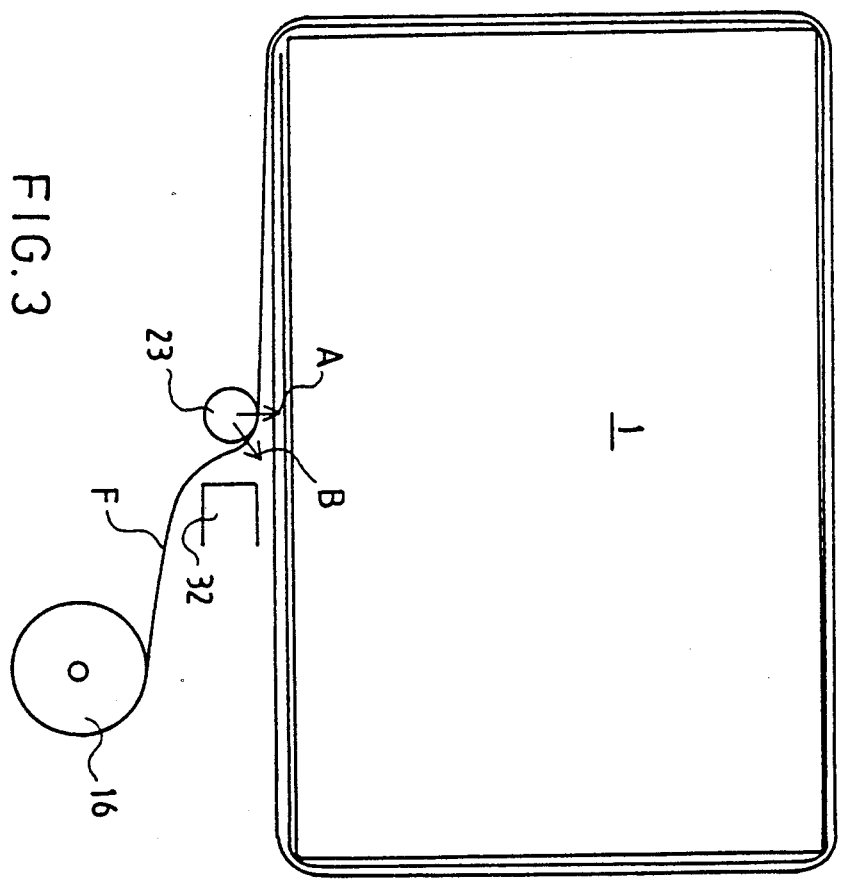

PROCESS AND MEANS FOR SEAMING AND CUTTING OFF A WRAPPING FILM

The present invention concerns a process for seaming and cutting off a wrapping film in a wrapping machine by means of which the wrapping film is wound around and on the product that has been conveyed into the wrapping machine, and wherein in the final stage of the wrapping process the wrapping film is held between jaws constituting a film holder.

The invention also concerns a means for seaming and cutting off a wrapping film in such a wrapping machine.

In wrapping machines, various products to be packaged are packaged by enveloping them in wrapping film in the way that wrapping film is wound around the product to be packaged, or the product to be packaged is itself rotated in the wrapping machine, whereby the wrapping film unwinds from a roll of film, onto the surface of the product. One of the problems in a wrapping machine of this kind is the question of how the wrapping film can be brought into contact with the surface of the product to be packaged when starting the wrapping process, and the question of how on terminating the wrapping process the wrapping film can be tidily seamed and cut off. It is therefore necessary to provide the wrapping machine with a gripping means which takes hold of the film for its conveyance into contact with the surface of the product to be packaged, with a seaming means for seaming and affixing the film, and with a cut-off means for cutting the film. In prior art these operations have been managed with separate means, with attendant consequence of complicated and functionally indefinite mechanisms. This drawback has been particularly accentuated in connection with small-sized products because it has been awkward with means conforming to the state of art to carry the film into contact with the surface of the product. Another drawback with reference to means conforming to the state of art has been the fact that after the film has been seamed and cut off there has after the seaming operation remained a long "tail" of the film, which has harmfully affected the external appearance of the packaged product.

The problem solution of the present invention is to provide a novel process, and means, for seaming and cutting the film, which is simpler than any earlier designs and which produces a seaming result superior to that achieved before.

In order to accomplish this, the process of the invention is characterized in that on termination of the wrapping process the wrapping film is with the aid of the jaws of the film holder carried into contact with the product to be packaged and seaming and cutting of the wrapping film is carried out with hot air blowing.

The means of the invention is on the other hand characterized in that the film holder has been arranged on termination of the wrapping process to move the film against the product to be packaged, and in that the film holder has been provided with means for producing a hot air blowing effect against the wrapping film for seaming and cutting the film with the aid of hot air.

The invention affords a number of significant advantages over previously known technology of said advantages the following may be pointed out here. The problem solution of the invention is rather more simple than any previous one; it involves fewer components; and its requirements of servicing are substantially less than those of any earlier apparatus. Therefore the manufacturing and operating costs will be less than before. The result of seaming is better and tidier than before, particularly when the means is used to wrap packages of variable size. On the whole it has to be noted that the means of the invention allows pallet size variation in very wide limits while still functioning well also when packaging products of small size. The other advantages and characteristic features of the invention will become apparent in the detailed description of the invention, following below.

The invention is next described by way of example, referring to the figures of the attached drawing.

FIG. 1 presents in a schematic and simplified perspective presentation, a wrapping machine which has been provided with a seaming and gripping means according to the invention.

FIG. 2 presents in a more detailed perspective view, the seaming and gripping means of the invention.

FIG. 3 illustrates in top view in a fully schematic figure, the seaming and cutting of the wrapping film.

Figure 1:
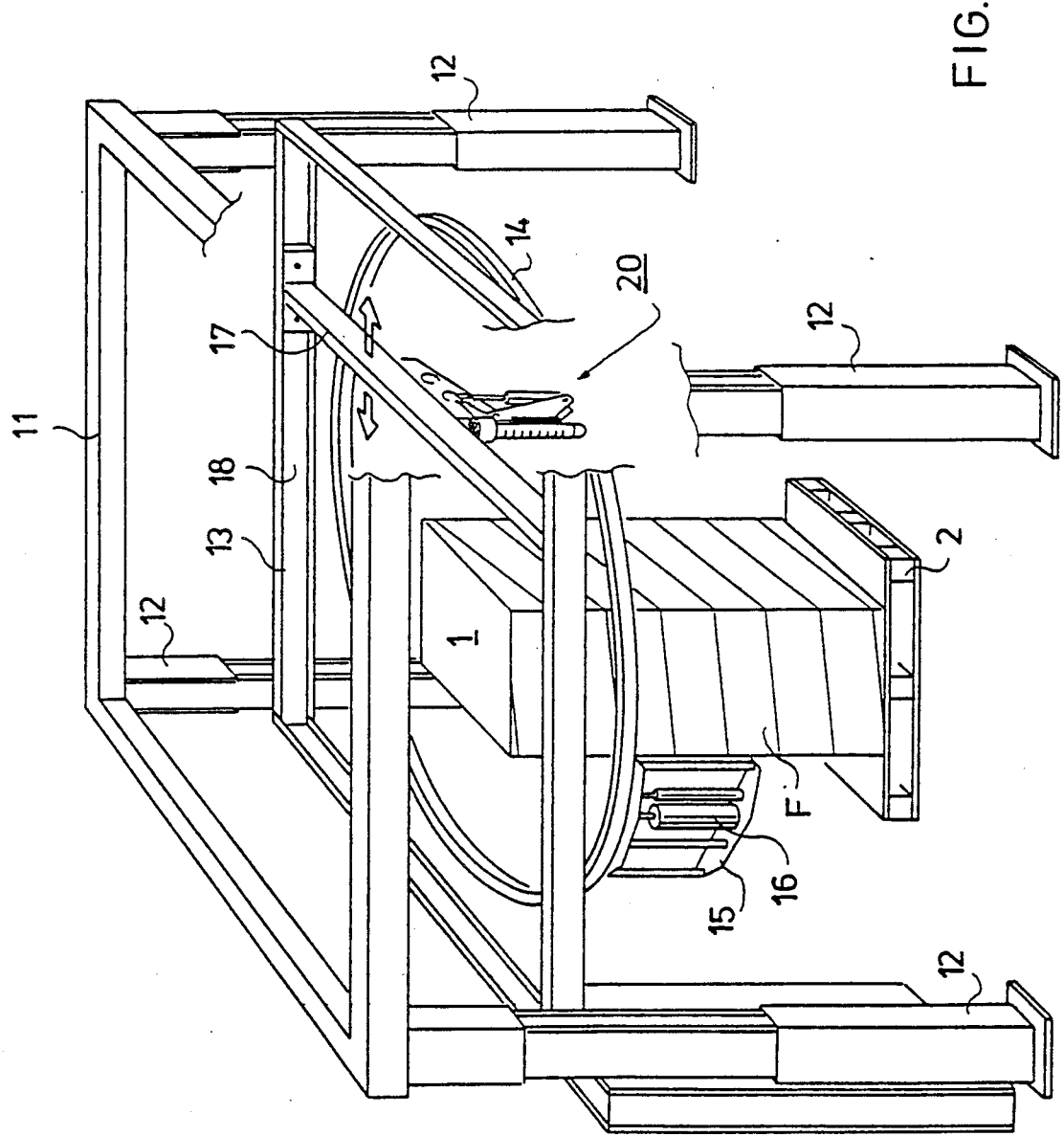

In FIG. 1 the wrapping machine in general is donated with reference numeral 10. The wrapping machine 10 comprises a frame structure comprising a crate 11 and legs 12. The wrapping machine is of the so-called wrapping ring machine type, provided with a rotating wrapping ring 14 which during the wrapping process carries along with itself a film distribution slide 15 carrying a roll of film 16 from which the wrapping film F is unwound and applied around the product to be packaged 1. In FIG. 1 the product to be packaged 1 consists of a palleted load, which has been deposited on a load pallet 2. The wrapping ring 14 has been mounted on a wrapping ring supporting frame 13, which has been disposed vertically movably in the frame structure 11, 12 of the wrapping ring in such manner that the film distribution slide 15 can be positioned at desired height in the various steps of the wrapping process. The seaming and gripping means 20 of the invention has been mounted on an auxiliary frame 17, disposed to be movable along guides 18 provided on the wrapping ring supporting frame 13. It is thus understood that in a wrapping machine 10 such as is shown in FIG. 1, the seaming and gripping means 20 is located inside the wrapping ring 14, but no detriment to the wrapping operation will result from this placement, owing to the design and mode of operation of said means.

The crate 11 is generally a square of beams placed horizontally at the upper part of the machine. The wrapping ring 14 is located horizontally and turned around its vertical axis. The roll of film has a vertical axis. The supporting frame 13 is slidably movable and located above the wrapping ring 14. The guides 18 are, for example, a part of the frame 13 and constituted by horizontal beams. The frame 17 is perpendicular to the guides 18 and horizontal. The gripping means 20 are secured fixed to the frame 17 so as to be directed generally down.

Figure 2:
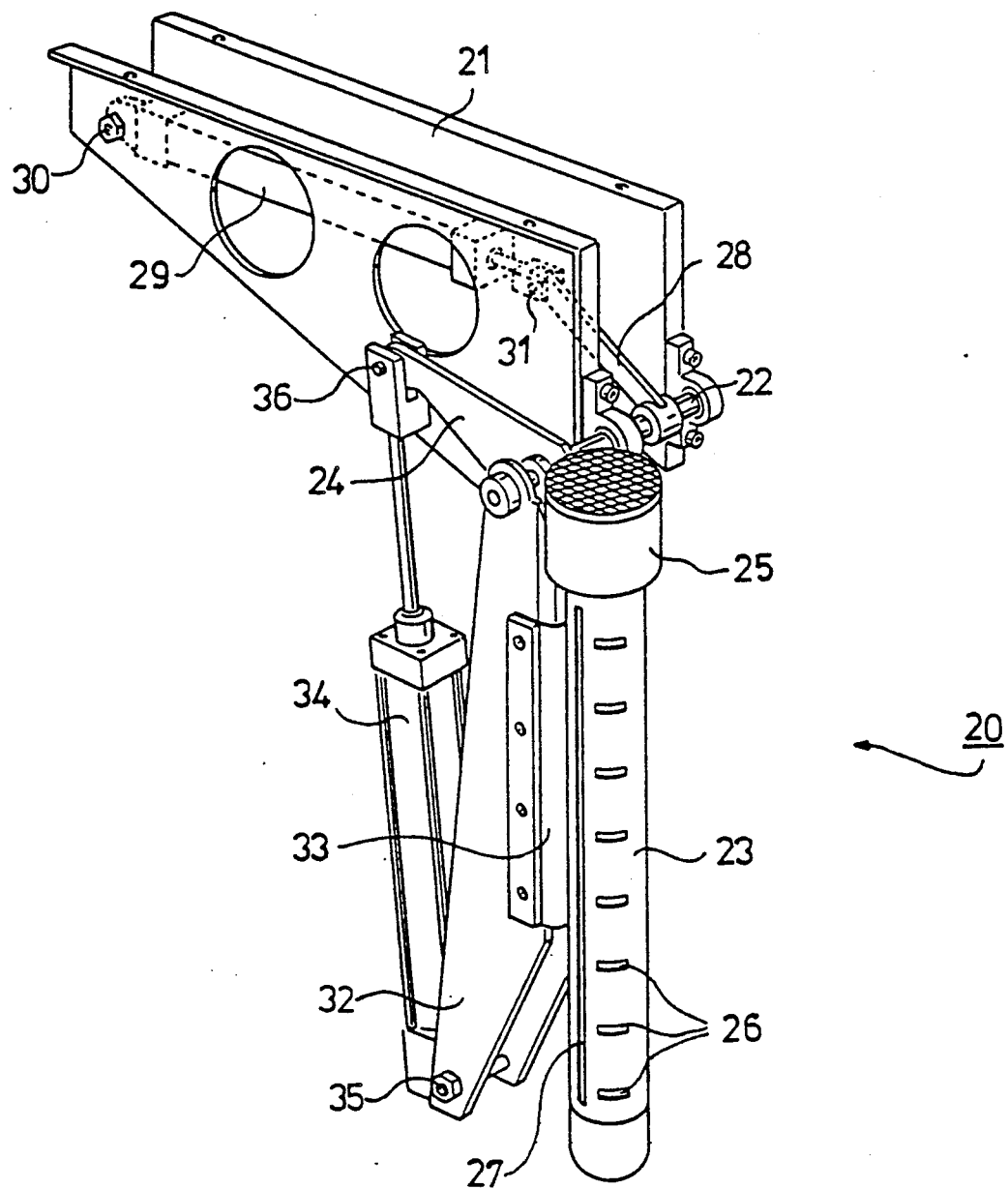

In FIG. 2 is presented in greater detail the design of the seaming and gripping means of the invention, 20. The seaming and gripping means 20 comprises a frame 21 by which the seaming and gripping means 20 is mounted on the auxiliary frame 17 shown in FIG. 1. The frame 21 carries, turnably mounted on the shaft 22, the jaws 23 and 32, which form a gripping means comprising a film holder, by which the wrapping film is seized. The first jaw 23 is by mediation of its mounting arm 24 rigidly fixed on the shaft 22 so that, when the shaft 22 is rotated, said first jaw will turn along with the shaft 22. To the purpose of rotating the shaft 22, a rotator arm 28 has been rigidly fixed on the shaft; this arm is moved by the aid of a first cylinder, particularly a compressed air cylinder 29. Said compressed air cylinder 29 is by its first end 30 pivotally attached to the frame 21 of the seaming and gripping means and by its second end 31, to the rotator arm 28 just mentioned. The second jaw 32 of the gripping means is turnably mounted on the shaft 22, and said second jaw 32 is turned in relation to the shaft 22 by the aid of a second compressed air cylinder 34, which is by its first end 35 pivotally attached to the second jaw and by its second end 36, to the end of the mounting arm 24, by mediation of which the first jaw 23 is rigidly mounted on the shaft 22. The second jaw 32 is provided with a friction coating 33, e.g. of rubber or equivalent, operating against the first jaw 23, by means of which the holding of the wrapping film between the jaws 23 and 32 is ensured when the jaws are closed.

In the seaming and gripping means of the invention the first jaw 23 also takes care of seaming and cutting off the wrapping film. To this end, the first jaw 23 has been formed of a hollow, tubular body which has been fitted with a heating means 25. The heating means 25 consists, for instance, of electrical resistances it equivalent, which are used to heat air with which the film seaming and cutting are performed. On the side of the cylindrical tube comprising the first jaw 23 have been provided seaming blow apertures 26, and an elongated cut-off blow aperture 27, the air heated up by the heating means 25 being blown through these apertures on the wrapping film, utilizing compressed air for instance. The air supply means have not been depicted in FIG. 2.

The mounting arm 24 is located close to the shaft 22 and broadly perpendicular to it and to the jaw 23. The air cylinder 29 is attached to the mounting arm 24 opposite to the shaft 22. The air cylinder 34 is attached to the free end of the jaw 33 which is at the opposite of the shaft 22, and to the mounting arm 24 opposite to the shaft 22. The apertures 26 are located separately along the jaw 23. And the aperture 27 is extended all along such jaw and closed to the apertures 26.

The operation of the means of the invention is next described with particular reference to FIGS. 3 and 4A-D. When the wrapping is commenced, the wrapping film is between the jaws 23 and 32, these jaws being used to convey the wrapping film F into contact with the product to be packaged 1. This is accomplished in that with the aid of the auxiliary frame 17, depicted in FIG. 1, the seaming and gripping means 20 is run into contact with the product to be packaged 1. The jaws 23 and 32 of the seaming and gripping means 20 are then in the position shown in FIG. 4A. When the wrapping process has been started and the wrapping film F has been carried over one corner of the product to be packaged 1, the first compressed air cylinder 29 is used to turn the jaws 23 and 32 into the position depicted in FIG. 4B, that is, up and out of the way of the wrapping operation. The wrapping film F is still between the jaws 23 and 32. When the wrapping has proceeded through one revolution around the product 1, jaws 23 and 32 are moved slightly apart with the aid of the cylinders 29 and/or 34 so that the end of the wrapping film is released. In other respects the jaws 23 and 32 are in the position shown in FIG. 4B throughout the wrapping process.

Figure 4A:
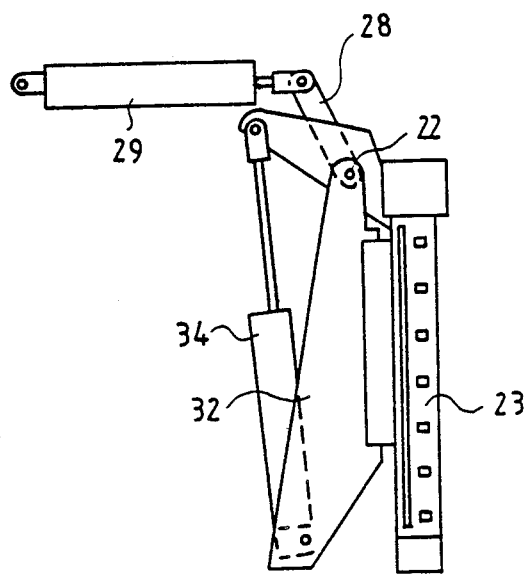
FIGS. 4A-4D illustrate schematically the functions of the seaming and gripping means of the invention, in the different steps of the wrapping process.
Figure 4B:
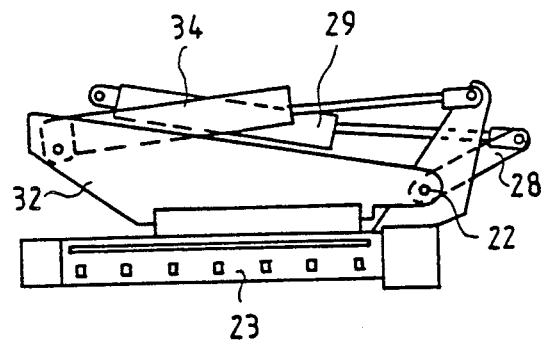
Figure 4C:
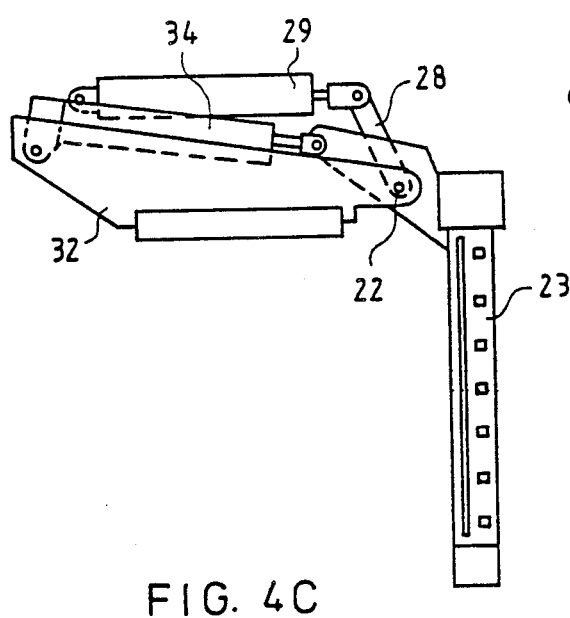
Figure 4D:
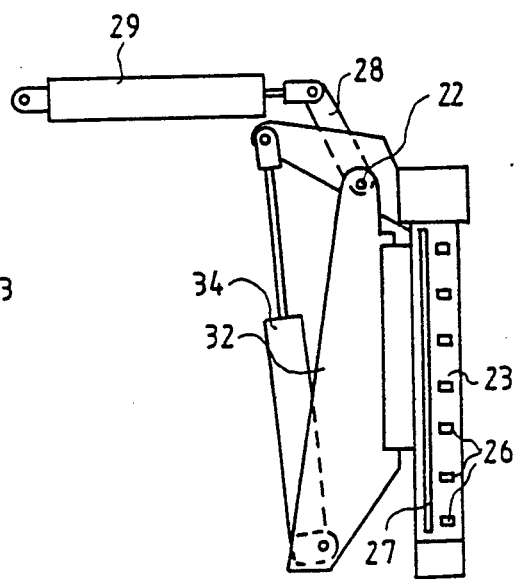

When the wrapping has proceeded to its final stage, the first jaw 23 is turned down into the position depicted in FIG. 4C, with the aid of the cylinder 29, whereas the second jaw 32 is still maintained with the aid of the cylinder 34 in the upper position shown in FIG. 4. At the same time the whole seaming and gripping means 20 is moved with the aid of the auxiliary frame 17 towards the product to be packaged. The wrapping film F discharging from the film distribution slide 15 then runs over the first jaw 23, whereafter the second compressed air cylinder is used to turn the second jaw 32 down so that the wrapping film F becomes locked between the jaws 23 and 32. This has resulted in the position of FIG. 4D. The seaming and gripping means 20 is next moved all the way to the surface of the product to be packaged 1, whereafter seaming and cutting of the wrapping film F are carried out with the aid of hot air in that the air heated by the heating means 25 is blown against the product to be packaged 1 as an air jet A for seaming, through the seaming blow apertures 26, and against the wrapping film F as a cut-off jet B, through the cut-off blow aperture 27. It is thus understood that seaming and cutting of the wrapping film F with the aid of hot air are carried out substantially simultaneously. Since the cut-off jet B is directed, as in particular FIGS. 2 and 3 show, immediately beside the seaming jet A, there will only remain a tail of minimal length after seaming of the wrapping film F, in connection with seaming and cutting the wrapping film F, thanks to which the packaged product gains a very attractive appearance when the means of the invention is used. After the seaming and cutting operations have been completed, the wrapping film F remains between the jaws 23 and 32 of the film holder of the seaming and gripping means 20, where it is in readiness for the next product to be packaged.

One more significant additional advantage is gained with the problem solution of the invention which has not been mentioned heretofore. This extra advantage is particularly associated with wrapping ring 14, such as shown in FIG. 1. As has already been described, the seaming and gripping means 20 has been mounted on an auxiliary frame 17, disposed to be movable in guides 18 on the wrapping ring supporting frame 13. As is apparent from FIG. 1, the seaming and gripping means 20 of the invention therefore always moves substantially on the same height as the film distribution slide 15. Hereby the significant additional advantage is gained that the seaming and gripping means 20 will always be on the correct height in relation to the film distribution slide 15, meaning that the wrapping may be commenced and terminated on whatever height is desired. Although the seaming and gripping means 20 of the invention is particularly advantageous in connection with wrapping machines 10 provided with a wrapping ring 14, the means of the invention is not restricted merely to machines of said type; it can equally be applied in other types of wrapping machines, e.g. in those which are provided with a revolving wrapping crank or with a rotating stand on which the product to be packaged itself is rotated during the wrapping process.

In the foregoing invention has been described by way of example, referring to the figures of the attached drawing. However, this is not meant to restrict the invention to concern merely the example that has presented in the figures; numerous modifications are feasible. Within the scope of the inventive idea defined by the claims following below.

I claim:

1. In a process for seaming and cutting off a wrapping film in a wrapping machine, comprising the steps of providing the wrapping machine with a film holder having first and second jaws and winding wrapping film about a product to be packaged with the wrapping machine, the improved process characterized by the steps of:
   locking the wrapping film between the first and second jaws subsequent to the step of winding wrapping film about the product;
   moving the first and second jaws against the surface of the wrapping film wound about the product;
   seaming the wrapping film locked between said first and second jaws to the wrapping film about the product by blowing hot air through at least one seaming aperture in the first jaw; and
   cutting off the wrapping film by blowing hot air through a cut-off aperture in the first jaw.

2. A process according to claim 1 characterized by the steps of seaming and cutting off the wrapping film being carried out substantially simultaneously by hot air directed through the at least one seaming aperture and the cut-off aperture in the first jaw.

3. A process according to claim 2 characterized by the step of heating the hot air blown through the first jaw within said first jaw.

4. A process according to claim 3 including the step of heating air supplied to said first jaw with an electric resistance heating device disposed within said first jaw.

5. A process according to claim 1 wherein the step of seaming the plastic film includes the step of blowing the hot air through a plurality of seaming apertures in said first jaw.

6. A process according to claim 5 including the step of blowing the hot air from the seaming apertures onto the film immediately beside the hot air blown onto the film from the cut-off aperture so that the film is cut off immediately after a seam has been formed.

7. In a device for seaming and cutting off a wrapping film in a wrapping machine, said wrapping machine arranged to wind the wrapping film about a product to be packaged, and said wrapping machine having a wrapping film holder including first and second jaws, the improvement comprising:
   means for locking the wrapping film between the first and second jaws after the film has been wound about the product;
   means for moving the first and second jaws against the surface of the wrapping film wound about the product;
   means for seaming the wrapping film in the jaws to the wrapping film wound about the product by blowing hot air through at least one seaming aperture in the first jaw; and
   means for cutting off the wrapping film between said first and second jaws by blowing hot air through a cut-off aperture in the first jaw.

8. A device as defined in claim 7 wherein said means for seaming and said means for cutting include means for producing hot air in said first jaw.

9. A device as defined in claim 2 wherein said first jaw comprises:
   a hollow cylindrical tube having air heating means disposed therein; and
   said at least one seaming aperture and said cut-off aperture provided in a wall of said cylindrical tube whereby air heated by the air heating means can be blown against the wrapping film for seaming and cutting off the wrapping film.

10. A device as defined in claim 9 wherein said air heating means comprises an electrical resistance device.

11. A device as defined in claim 9 wherein said cutoff aperture and said at least one seaming aperture are disposed immediately side by side in the wall of said cylindrical tube whereby the blowing air for seaming is directed on the wrapping film immediately beside the blowing air for cutting off the wrapping film.

12. A device as defined in claim 9 further including a plurality of spaced, seaming apertures disposed on the length of said first jaw and a narrow cut-off aperture substantially equal in length to said first jaw.

* * * * *

UNITED STATES PATENT AND TRADEMARK OFFICE
CERTIFICATE OF CORRECTION

PATENT NO.  : 4,993,209
DATED       : February 19, 1991
INVENTOR(S) : Matti Haloila It is certified that error appears in the above-identified patent and that said Letters Patent is hereby corrected as shown below:

On the Title page, in the heading, after Item [22] insert --

Foreign Application Priority Date April 14, 1989 Finland

891798--.

Column 6, line 21, Claim 9; "2" should read --7--.

Signed and Sealed this

Eighteenth Day of August, 1992

Attest:

DOUGLAS B. COMER

Attesting Officer

Acting Commissioner of Patents and Trademarks